Patented June 28, 1932

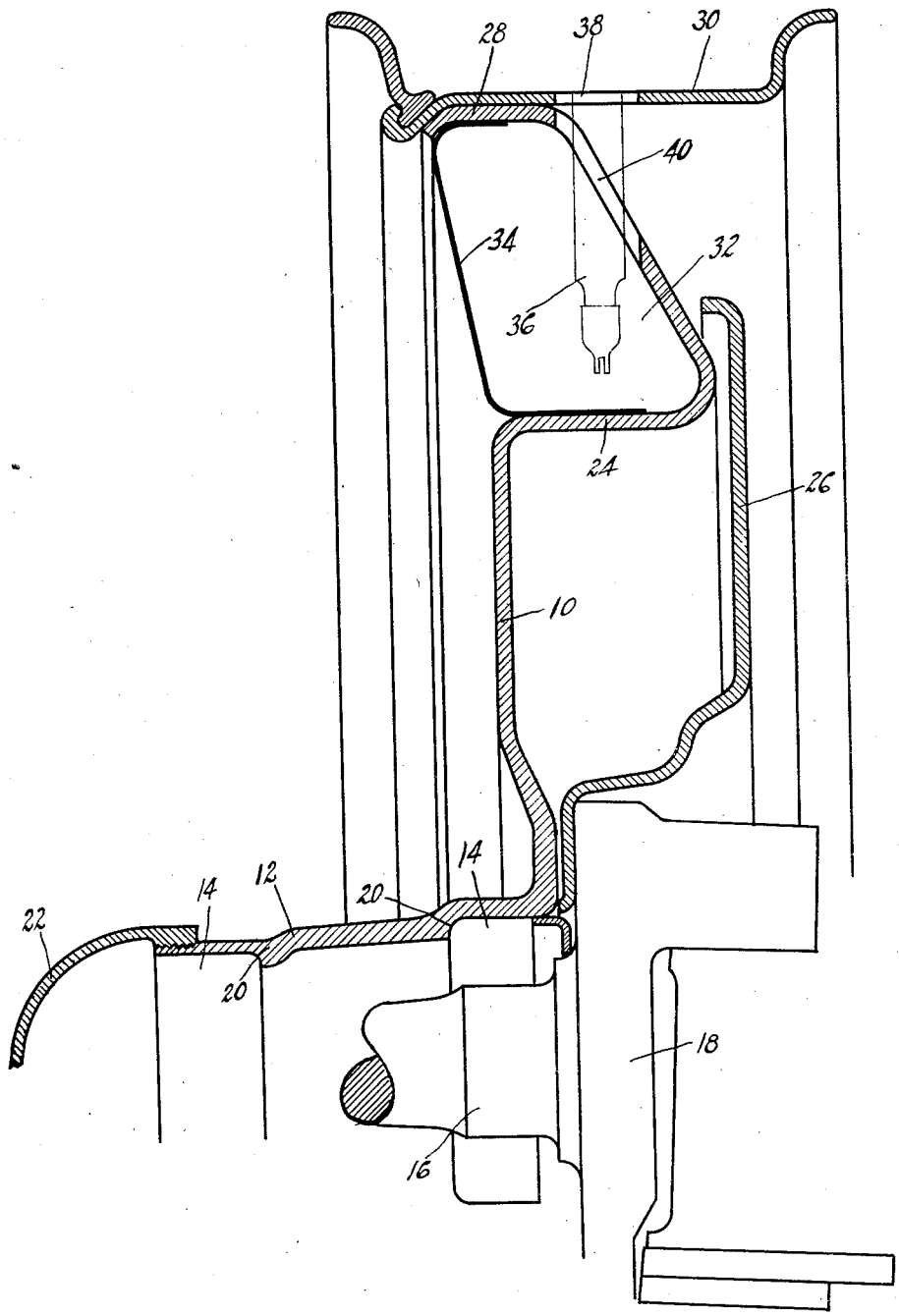

1,864,969

UNITED STATES PATENT OFFICE

D'ORSAY McCALL WHITE, OF CHICAGO, ILLINOIS, ASSIGNOR, BY MESNE ASSIGNMENTS, TO BENDIX BRAKE COMPANY, OF CHICAGO, ILLINOIS, A CORPORATION OF ILLINOIS

DISK WHEEL

Application filed September 2, 1925. Serial No. 54,030.

This invention relates to wheels, and is illustrated as embodied in a front automobile disk wheel. An object of the invention is to lessen the cost of a wheel of this character by forming the wheel disk and the brake drum, and preferably also the hub, all in one piece. In the illustrated form, the hub is drawn outwardly of the disk and the brake drum inwardly, suitable seats for anti-friction bearings being provided in the ends of the hub.

In one desirable arrangement the wheel disk continues radially from the inner edge of the brake drum and is turned outwardly as a rim-supporting flange. The annular depression between this flange and the brake drum may, if desired, be covered by a light annular stamping.

Various novel features of construction, and the great advantage of the invention, will be apparent from the following description of one illustrative embodiment shown in the accompanying drawing, in which:

The figure is a vertical section through the top half of a front automobile wheel, and through associated parts.

The novel wheel shown includes a wheel disk 10, drawn outwardly at its center to form an integral tubular hub 12. This hub is preferably bored out from opposite ends to form cylindrical seats 14 for anti-friction bearings (not shown) between the hub and the spindle 16 of a front wheel knuckle 18.

At the ends of seats 14 nearest the center of the hub are formed abrupt bearing positioning shoulders 20. A cap 22 may close the end of the hub.

Some distance further from its center than hub 12, the wheel disk is drawn in the opposite direction to form an integral cylindrical brake drum 24, shown closed by a backing plate 26 carried by knuckle 18, it being intended that the friction means of the brake be housed between plate 26 and the wheel disk inside of drum 24.

Wheel disk 10 continues radially from the inner edge of the brake drum, preferably flaring outwardly, and is turned outwardly at its edge to form a flange 28 supporting a suitable tire-carrying demountable rim 30. The annular depression 32 between flange 28 and drum 24 may, if desired, be covered by a light annular stamping 34 having an opening affording access to the tire valve 36 projecting into the depression through openings 38 and 40 in rim 30 and in the wheel disk.

While one illustrative embodiment has been described in detail, it is not my intention to limit the scope of the invention to that particular embodiment, or otherwise than by the terms of the appended claims.

I claim:

1. A one-piece wheel disk and brake drum having an integral tubular hub projecting outwardly at its center, and formed with an inwardly-projecting brake drum further from its center, the disk continuing radially from the inner edge of the brake drum and terminating in an outwardly-directed rim-supporting substantially cylindrical flange, said flange and drum defining an outwardly-opening annular depression, in combination with a relatively light annular stamping covering said annular depression.

2. A wheel having a supporting disk drawn outwardly at its center forming a hub portion and outwardly at its margin forming a rim supporting flange portion and inwardly between said hub and marginal flange forming a brake drum portion, and a rim mounted on said rim supporting flange portion in such position that its central plane bisects said brake drum portion.

3. A wheel having a supporting disk drawn outwardly at its center forming a tubular central hub portion and outwardly at its margin forming a cylindrical rim supporting flange portion lying substantially between radial planes drawn through the ends of the hub portion and drawn in the opposite direction out of the line of said flange and hub portions forming a cylindrical brake drum portion, and a rim mounted on said rim supporting flange portion in such position that its central plane bisects said brake drum portion.

4. A wheel comprising a brake drum, a closure wall integral therewith, a wheel web integral with the brake drum, said wheel web adapted to carry a tire retaining means on the periphery thereof, the wheel comprising a single piece structure pressed or formed from sheet metal, said combination drum and web acting jointly to sustain the vehicle load imposed thereon, and said tire retaining means center and brake drum center being in the same plane to evenly and centrally apply the brake retarding force to the tire.

5. A vehicle wheel comprising a one-piece wheel disk having an inwardly projecting brake drum midway between its edge and center, an integral tubular hub projecting outwardly at its center, and an outwardly directed flange at its outer edge, and a tire-carrying rim supported on said flange, the parts being so arranged that the central planes of said rim and brake drum substantially coincide.

In testimony whereof I have hereunto signed my name.

D'ORSAY McCALL WHITE.